US006257560B1

(12) United States Patent
Kim (10) Patent No.: US 6,257,560 B1
(45) Date of Patent: Jul. 10, 2001

(54) FOUNTAIN HUMIDIFIER AND AIR CLEANSER

(76) Inventor: Kevin Kim, 8 Edith Court, Old Bridge, NJ (US) 08857

( * ) Notice: Subject to any disclaimer, the term of this patent is extended or adjusted under 35 U.S.C. 154(b) by 0 days.

(21) Appl. No.: 09/325,808

(22) Filed: Jun. 4, 1999

(51) Int. Cl.[7] .................................................. B01F 3/04
(52) U.S. Cl. .................... 261/36.1; 261/115; 261/142; 239/17
(58) Field of Search ........................... 261/36.1, 66, 115, 261/128, 142; 239/12, 13, 16, 17, 20

(56) References Cited

U.S. PATENT DOCUMENTS

| | | | |
|---|---|---|---|
| 841,782 | * 1/1907 | James | 239/16 |
| 1,243,126 | * 10/1917 | Ziener | 239/20 |
| 2,888,205 | * 5/1959 | Trucco | 239/20 |
| 2,958,468 | * 11/1960 | Long | 239/20 |
| 4,591,094 | * 5/1986 | Morris | 239/20 |
| 4,705,216 | * 11/1987 | Kaffka et al. | 239/20 |
| 4,747,538 | * 5/1988 | Dunn et al. | 239/20 |
| 5,637,361 | 6/1997 | Scheurich | 428/13 |
| 5,695,119 | 12/1997 | Lien | 239/17 |
| 5,783,117 | 7/1998 | Byassee | 261/29 |
| 5,862,984 | 1/1999 | Chang | 239/17 |

FOREIGN PATENT DOCUMENTS

| | | | |
|---|---|---|---|
| 35 10 162 A1 | * 9/1986 | (DE) | 239/17 |
| 39 00 124 A1 | * 7/1989 | (DE) | 239/17 |

OTHER PUBLICATIONS

Flowerpot Fountain, article and design, Country Sampler's Decorating Ideas, pp. 24 and 74, Jun. 1997.*

* cited by examiner

*Primary Examiner*—C. Scott Bushey
(74) *Attorney, Agent, or Firm*—Michael I. Kroll (57) ABSTRACT

A fountain humidifier and air cleanser for providing moisture to surrounding air. The fountain humidifier and air cleanser includes a base including a skirt extending therefrom forming a reservoir for retaining a fluid therein and a hollow structure including a recess in a top side thereof and an open base side having an irregularly shaped edge. The hollow structure is removably positioned within the reservoir whereby fluid within the reservoir is able to flow into the structure through spaces present between the base side and reservoir due to the irregularly shaped edge. A pump is positioned within the hollow structure and a diverter is connected to the pump. The diverter extends through the recess in the top side of the hollow structure, wherein the pump pumps fluid within the reservoir against the diverter causing the fluid to form a dome shaped flow through the recess and back into the reservoir. The fluid flowing through the recess and along the side of the diverter is at least partially absorbed by the surrounding air thereby humidifying the surrounding air. The diverter includes a cap portion having a planar underside and a curved columnar shaft extending from the underside of the cap, wherein fluid from the pump is directed along the curved columnar shaft and planar underside to form the dome shaped flow.

5 Claims, 11 Drawing Sheets

FOUNTAIN HUMIDIFIER AND AIR CLEANSER

BACKGROUND OF THE INVENTION

1. Field of the Invention

The present invention relates generally to humidifiers and, more specifically, to a humidifying device wherein water contained within a reservoir is collected and splayed by a diverter extending from the reservoir thereby creating a water dome which returns the water back to the reservoir, the splaying of water through the diverter acts to humidify the surrounding air and remove dust and particles from the surrounding air.

2. Description of the Prior Art

There are other humidifying device designed for adding moisture into the air. For example, U.S. Pat. Nos. 5,637,361; 5,695,119; 5,783,117 and 5,862,984 are illustrative of such devices. While these humidifiers may be suitable for the purposes for which they were designed, they would not be as suitable for the purposes of the present invention, as hereinafter described.

A tabletop fountain includes a water reservoir. A recirculating pump is disposed in the water reservoir. An ascending water pipe is connected to the pump. A sheathing that is advantageously formed of rock or rock-like material, guides and at least partially covers or hides the water pipe. A plant dish is insertable into the water reservoir. A cover has holes formed therein. An upwardly oriented separating strip is disposed on the cover.

This invention relates to a fountain device with water screen circulating and alternating mechanism which is composed of a water supply device, a fountain base, a water screen circulating and alternating mechanism and at least one or more nozzles, wherein the water supply device containing a spurt water stand, a reservoir and a water pump. The fountain base having a water inlet connected to the water pump and a plurality of water holes, which being installed on the water supply device. The water screen circulating and alternating mechanism being composed of a rotary shaft in which having a water diversion hole and an eccentric trumpet water diversion outlet, a drive wheel having a plurality of radial plates and a drive worm connected with the shaft of the drive wheel and engaged with a worm gear installed at the circumference of the rotary diversion shaft, furthermore each nozzle having a plurality of nozzle inlets connected to the water holes of the fountain base, water being led to each nozzle and the radial plates, the drive wheel can be rotated by hydraulic power to drive the rotary diversion shaft, thus the trumpet water diversion outlet can aim at the water holes by turns so that water led to each nozzle can spurt out to form various water screen when the rotary diversion shaft being rotated.

An evaporative humidifier includes a top cover and a water reservoir tank removably mounted on top of a base platform. Several of the components of the humidifier contain a biocide for resisting the growth of bacteria and fungi on all surfaces of the components. The humidifier includes, in one embodiment, a pump assembly for moving water from the base platform to the top of an evaporator panel disposed in an air stream drawn through the humidifier. Alternatively, a paper wick is partially submerged in the pool of water in the base platform for drawing water up into the air stream by capillary action.

An ornamental artificial fountain apparatus according to the invention includes a water basin, in which a peripherally extending annular water pipe with a plurality of nozzles is provided at a decent level. The inclination angles of nozzles are adjustable. Inside the water basin there is installed a guide pole in which a control mechanism is provided to regulate the water stream flowing through the guide pole and its spreading area. A multiple-port joint connects the pump with the annular water pipe and the guide pole by its two side branch pipes. By means of a cock on the multiple-port joint, the water flow entering the annular water pipe and the guide pole can be tuned at will. Moreover, along with ascent and descent of a canopy of the guide pole as well as nozzles of assorted inclination angles, the apparatus can generate varying streams and water curtains.

SUMMARY OF THE PRESENT INVENTION

The present invention relates generally to humidifiers and, more specifically, to a humidifying device wherein water contained within a reservoir is collected and splayed by a diverter extending from the reservoir thereby creating a water dome which returns the water back to the reservoir, the splaying of water through the diverter acts to humidify the surrounding air and remove dust and particles from the surrounding air.

A primary object of the present invention is to provide a fountain humidifier and air cleanser which overcomes the shortcomings of the prior art.

A further object of the present invention is to provide a fountain humidifier and air cleanser which is able to naturally humidify the surrounding air.

Another object of the present invention is to provide a fountain humidifier and air cleanser having a pedestal reservoir for maintaining an amount of water therein.

Yet another object of the present invention is to provide a fountain humidifier and air cleanser having a submersible pump positioned within the reservoir for water from the pedestal reservoir to be splayed in the form of a water dome prior to returning to the reservoir.

Still yet another object of the present invention is to provide a fountain humidifier and air cleanser having a bell-like housing for segregating a portion of the reservoir having the submersible pump therein from the remainder of the reservoir.

Yet another object of the present invention is to provide a fountain humidifier and air cleanser having an upper aperture for supporting the diverter.

Still yet another object of the present invention is to provide a fountain humidifier and air cleanser wherein the diverter that communicates with the pump by means of a conduit extending therebetween.

Another object of the present invention is to provide a fountain humidifier and air cleanser that is simple and easy to use.

A still further object of the present invention is to provide a fountain humidifier and air cleanser that is economical in cost to manufacture.

Additional objects of the present invention will appear as the description proceeds.

A fountain humidifier and air cleanser for providing moisture to surrounding air is described by the present invention. The fountain humidifier and air cleanser includes a base including a skirt extending therefrom forming a reservoir for retaining a fluid therein and a hollow structure including a recess in a top side thereof and an open base side having an irregularly shaped edge. The hollow structure is removably positioned within the reservoir whereby fluid within the reservoir is able to flow into the structure through spaces present between the base side and reservoir due to the irregularly shaped edge. A pump is positioned within the hollow structure and a diverter is connected to the pump. The diverter extends through the recess in the top side of the hollow structure, wherein the pump pumps fluid within the reservoir against the diverter causing the fluid to form a dome shaped flow through the recess and back into the reservoir. The fluid flowing through the recess and along the side of the diverter is at least partially absorbed by the surrounding air thereby humidifying the surrounding air. The diverter includes a cap portion having a planar underside and a curved columnar shaft extending from the underside of the cap, wherein fluid from the pump is directed along the curved columnar shaft and planar underside to form the dome shaped flow.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DETAILED DESCRIPTION OF THE PREFERRED EMBODIMENT

Turning now descriptively to the drawings, in which similar reference characters denote similar elements throughout the several views, FIGS. 1 through 11 illustrate the fountain humidifier and air cleanser of the present invention indicated generally by the numeral 10.

Figure 1:
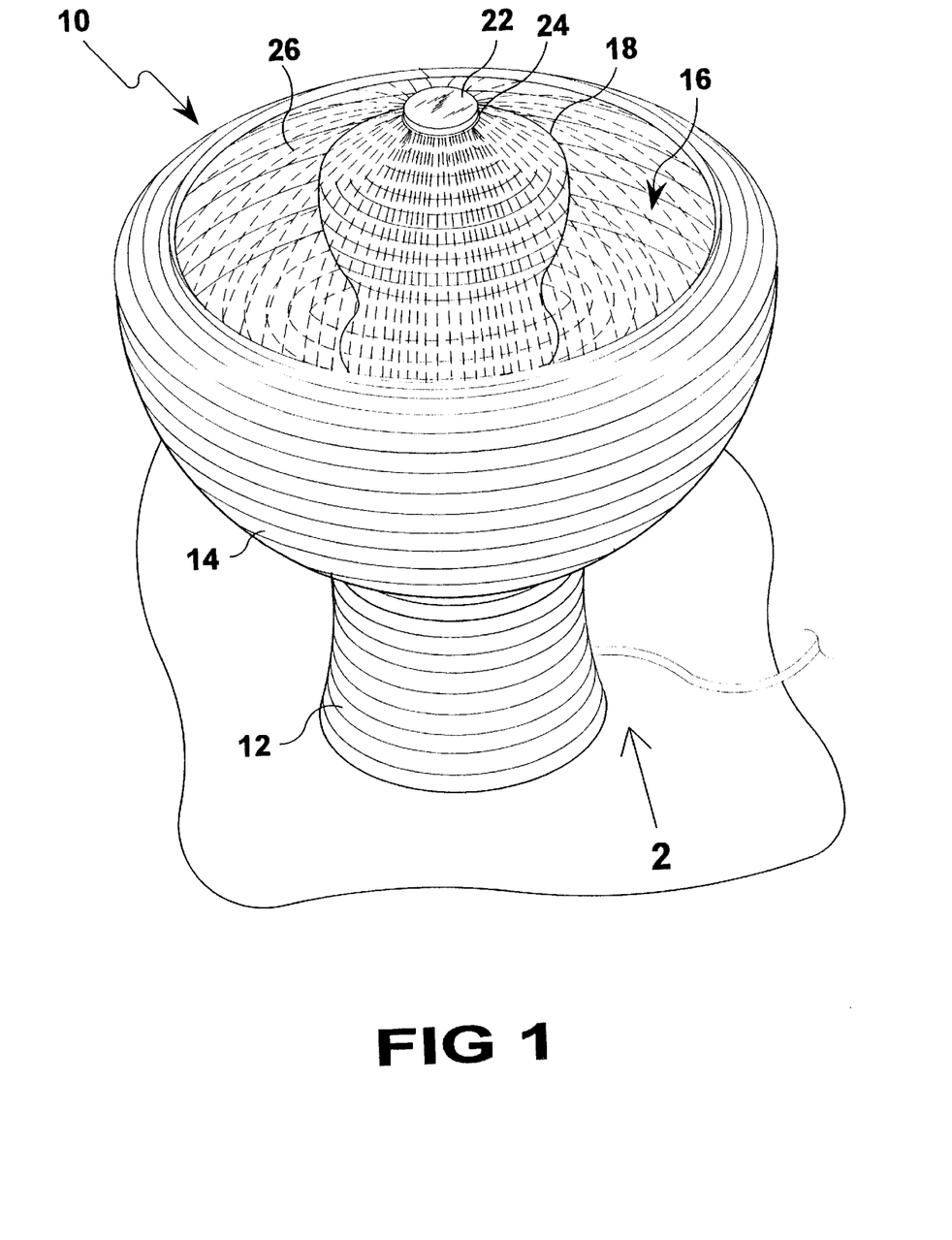
FIG. 1 is a perspective view of the fountain humidifier and air cleanser of the present invention.

The fountain humidifier and air cleanser 10 is shown in FIG. 1 and includes a base 12 having a skirt 14 extending from a top portion thereof to form a reservoir 16. The reservoir 16 is provided for receiving a supply of liquid, preferably water. Removably positioned within a central portion of the reservoir 16 is a bell-shaped housing 18. The bell-shaped housing 18 divides the reservoir into first and second sections whereby flow of the liquid within the reservoir is regulated between the first and second sections by the bell-shaped housing 18. Within the bell-shaped housing 18 is a submersible pump 20. A diverter 22 is provided to extend from the submersible pump 20 and through a recess 24 in the bell-shaped housing 18. Water is pumped by the submersible pump 20 to the diverter 22 which splays the fluid to form a dome 26 of fluid exiting a top of the bell-shaped housing 18. The fluid exiting the bell-shaped housing 18 is returned to the reservoir 16. Extending from the submersible pump 20 and through the base 12 is an electrical wire 28 for supplying power to the submersible pump 20 thereby allowing the pump 20 to pump the fluid within the reservoir.

Figure 2:
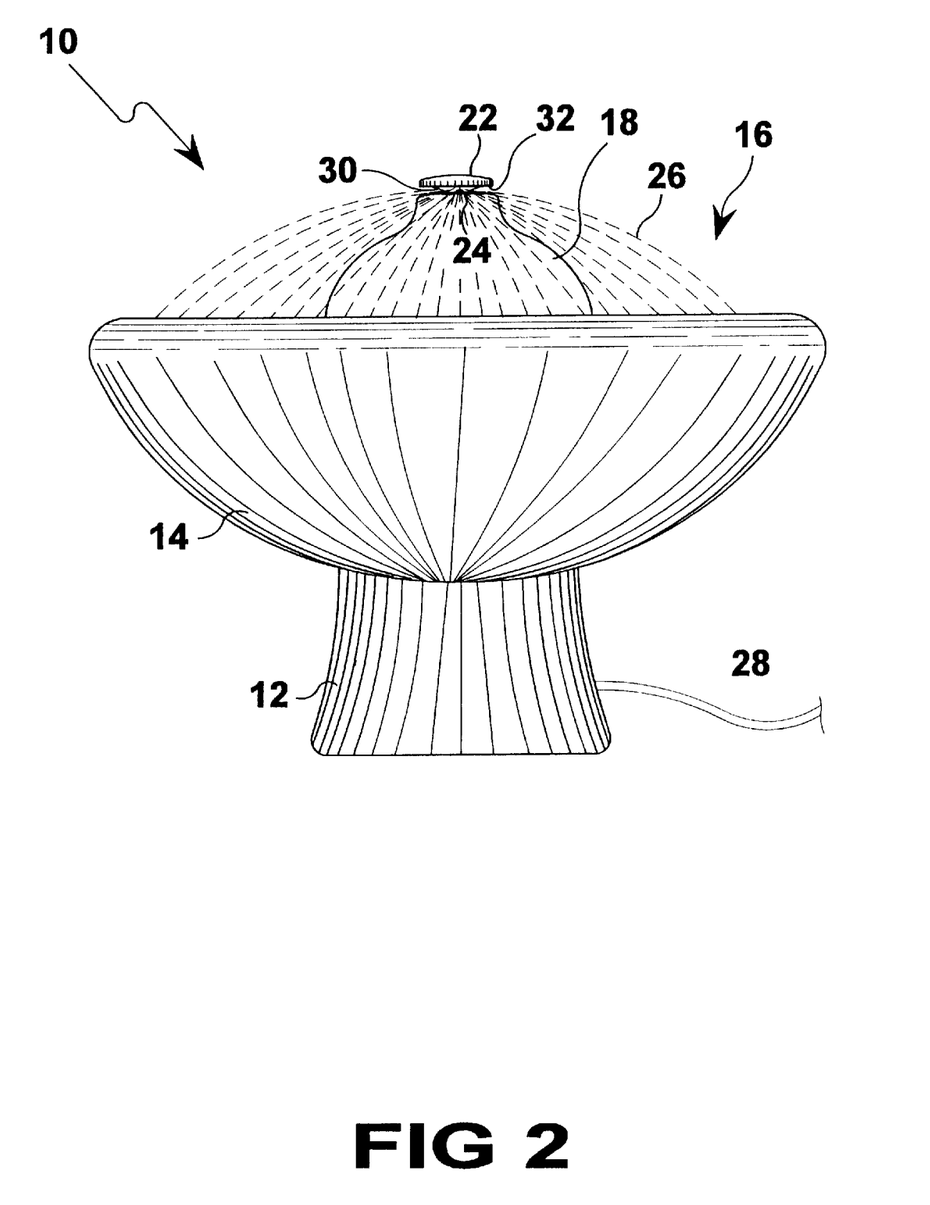
FIG. 2 is a side view of the fountain humidifier and air cleanser of the present invention.

As can be seen from FIG. 2, the diverter 22 includes a curved columnar surface 30 extending into a planar underside 32. When a rising column of fluid is directed out of the recess 24 it rides along the curved columnar surface 30 towards the planar underside 32. The curved surface 30 and planar underside 32 act to splay the fluid when exiting through the recess 24 to thereby form the cascading dome 26 surrounding the bell-shaped housing 18 as the fluid is returned to the reservoir 16. The diverter 22 extends out from the recess 24 and is positioned an adjustable distance above the recess 24. This allows for the shape and breadth of the dome 26 of fluid to be adjusted by changing the height of the diverter 22.

Figure 3:
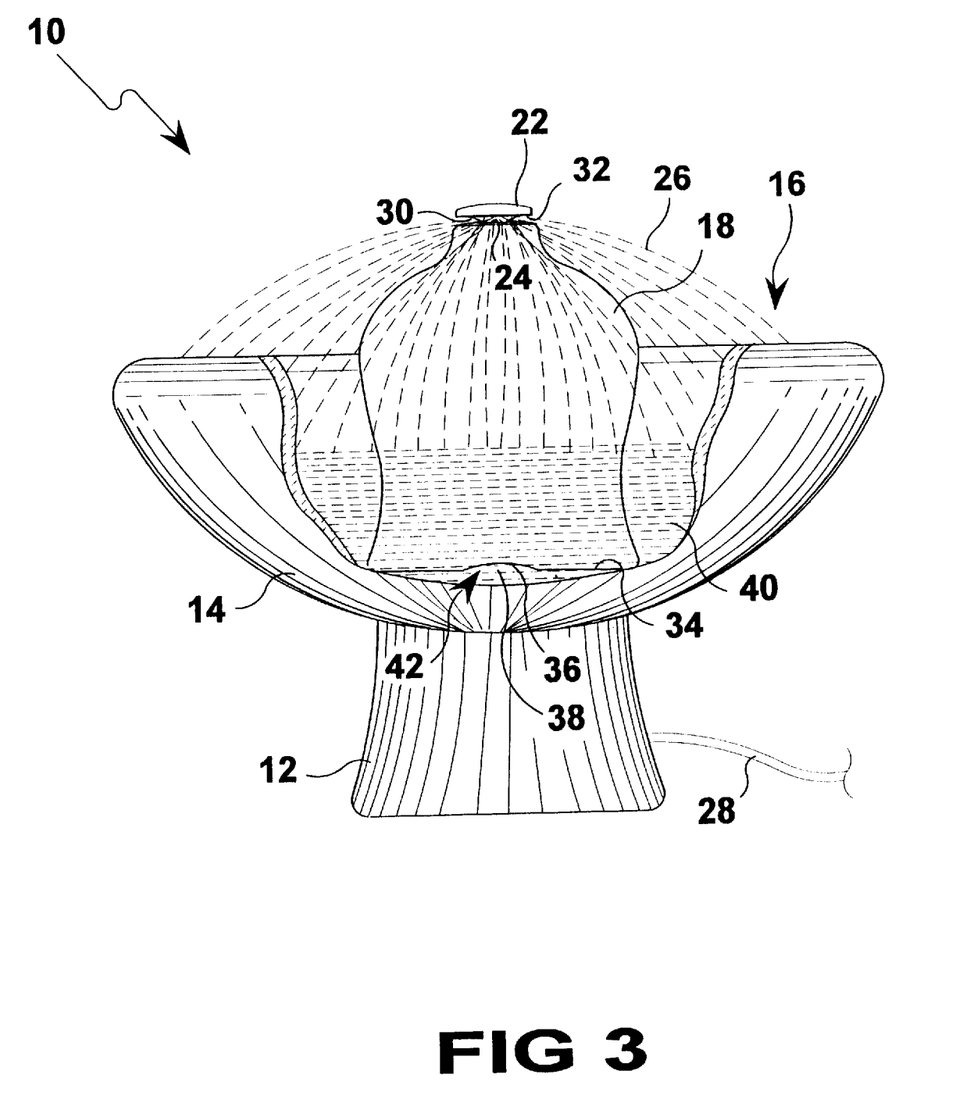
FIG. 3 is a partial cutaway view of the pedestal humidifier reservoir and the removable bell-like structure of the fountain humidifier and air cleanser of the present invention.

A side view of fountain humidifier and air cleanser 10 with parts cut away is illustrated in FIG. 3. As can be seen from this figure, the reservoir 16 holds a supply of fluid therein. The cut away portion of the skirt 14 provides a view of a base 34 of the bell-shaped housing 18. As can be seen, the bell-shaped housing 18 includes at least one irregularly shaped edge 36 providing a narrow space 38 between the base 34 of the bell-shaped housing 18 and a base of the reservoir 16. The narrow space 38 allows the fluid to communicate between the first and second sections 40 and 42, respectively. The fluid passing into the second section 42 may be received by the submersible pump 20 from where it will be ejected through a conduit and the diverter 22 and back into the reservoir 16.

Figure 4:
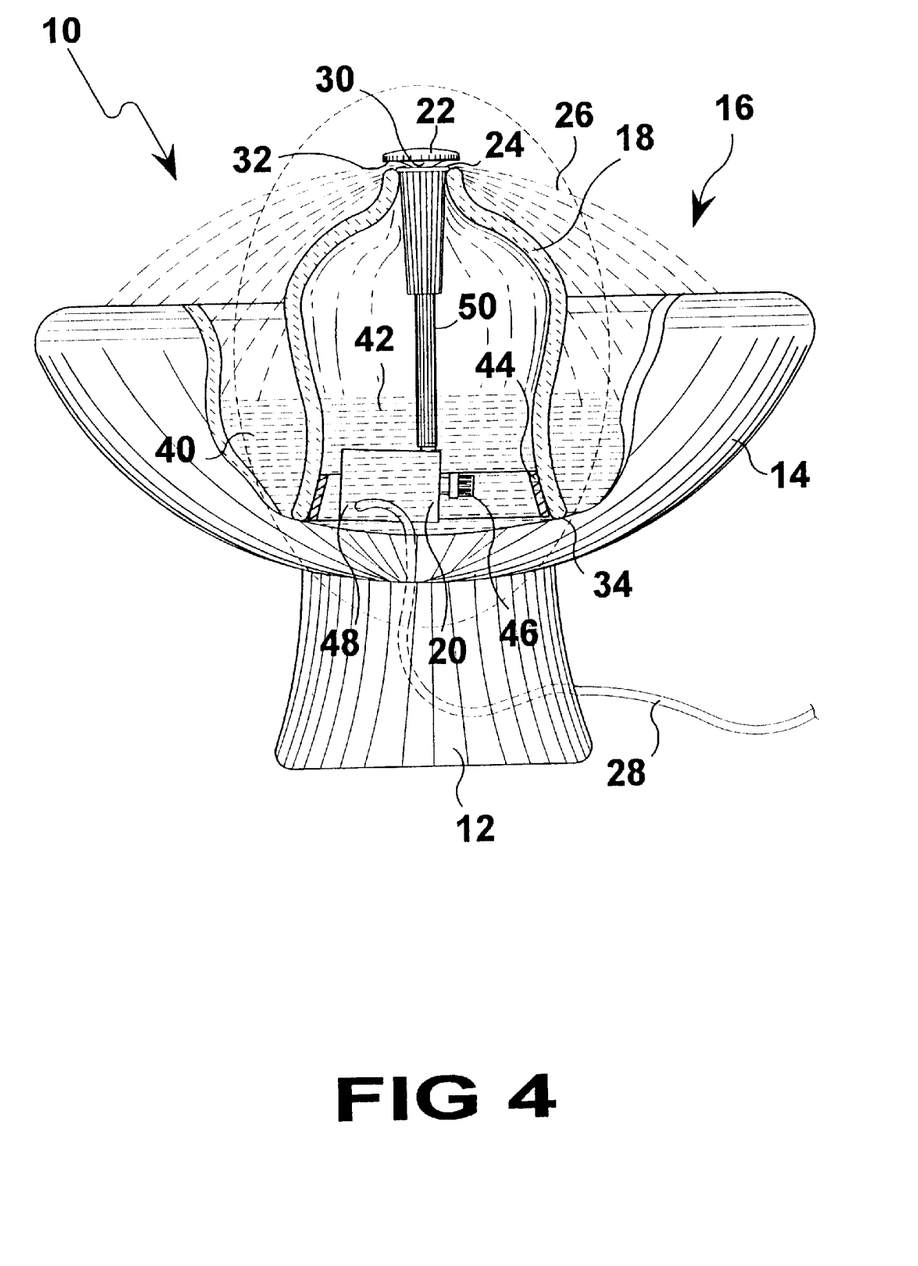
FIG. 4 is a side view in partial cross-section of the fountain humidifier and air cleanser of the present invention.

The partial cross-sectional view of FIG. 4 shows the submersible pump 20 positioned within the bell-shaped housing 18. As can be seen from this figure, a reusable filter media 44 surrounds the base 34 of the bell-shaped housing 18 thereby filtering the fluid which flows through the narrow spaces 36 and into the second section 42 of the reservoir 16. The reusable filter media 44 acts to remove small particulate matter from the fluid. The submersible pump 20 is positioned within the second section 42 and is covered by the bell-shaped housing 18. The submersible pump 20 includes an intake port 46 through which the fluid is suctioned by the pump 20 from the second section 42. A pump motor is contained within the pump housing 48 and a conduit 50 extends from the pump housing 48. The diverter 22 is adjustably connected to an end of the conduit 50 opposite the pump motor housing 48. The conduit 50 receives the fluid suctioned through the intake port 46 and provides the fluid to the diverter 22 where it is splayed against the horizontal planar surface 32 upon exiting trough the circumferential aperture 24 forming the dome 26 of fluid falling into the reservoir 16.

Figure 5:
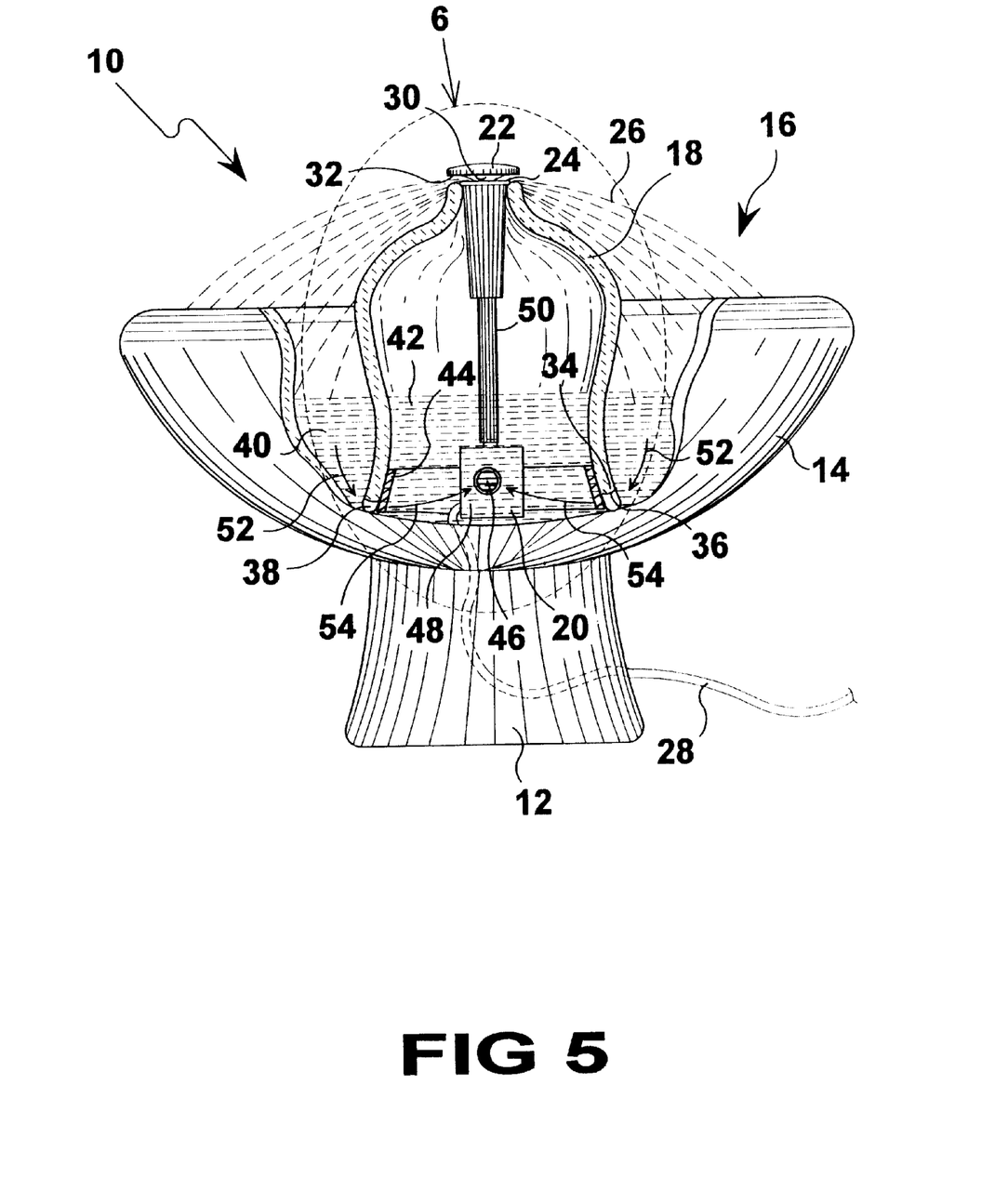
FIG. 5 is a side view in partial cross-section of the fountain humidifier and air cleanser of the present invention.

A partial cross-sectional view taken from the right side of FIG. 4 is illustrated in FIG. 5. This view shows fluid flowing from the first section 40 through the narrow openings 38 and into the second section 42 as indicated by the arrows labeled with the numeral 52. The fluid flowing into the second section 42 is then drawn into the intake port 46 as indicated by the arrows labeled with the numeral 54 due to the suctional force created by the submersible pump 20. A screen 47 is positioned to cover the input port 46 thereby preventing objects from entering the impeller area of the pump 20 through the input port 46.

Figure 6:
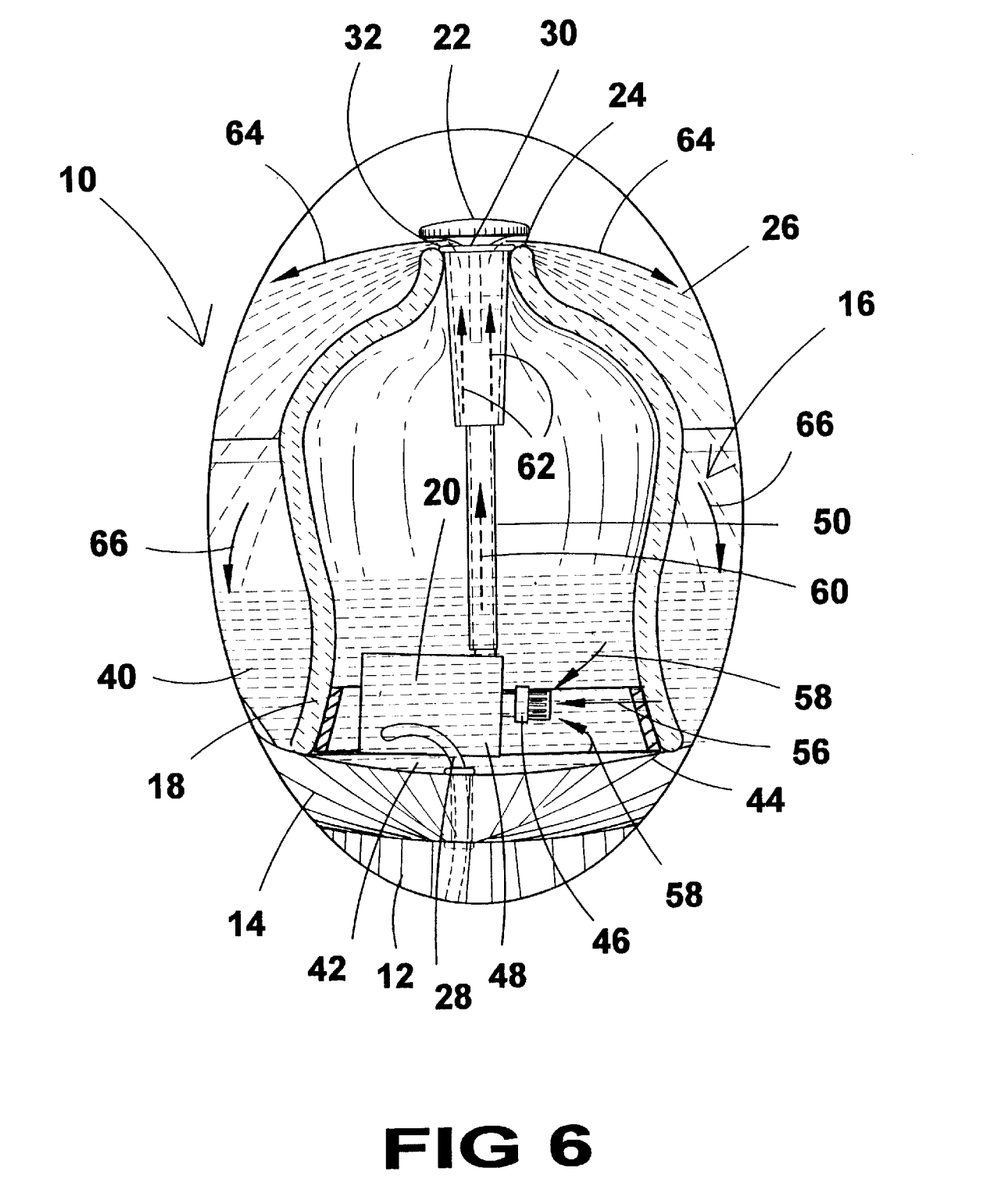
FIG. 6 is an enlarged view of the fountain humidifier and air cleanser of the present invention taken from within the circle labeled 6 of FIG. 4.

An enlarged view of the cycle followed by the fluid within the reservoir 16 is illustrated in FIG. 6. The fluid is first placed within the reservoir 16 where it remains until the pump 20 is turned on. The fluid is able to flow between the first and second sections 40 and 42 through the narrow spaces 38 formed between the irregular edge 36 of the base 34 of the bell-shaped housing 18 and the reservoir 16. The fluid flows through the narrow spaces 38 and filter 44 to remove any particles therein and into the second section 42 as indicated by the arrow labeled 56. Once the pump 20 is turned on, the fluid is drawn in to the intake port 46 as indicated by the arrows labeled 58 by a suctional force created by the pump 20. The fluid received by the intake port 46 is provided to the conduit 50 through which it is pumped by the pump 20 as indicated by the arrows labeled with the numeral 60. The fluid flowing through the conduit 50 is then relayed to the diverter 22 as indicated by the arrows labeled with the numeral 62. The fluid provided to the diverter 22 is projected through the recess 24 and against the curved surface 30 and planar underside 32 as indicated by the arrows labeled with the numeral 64 to produce the dome 26. The fluid forming the dome 26 then falls back into the first section 40 of the reservoir 16 as indicated by the arrows labeled with the numeral 66 wherein it is recycled through the above described cycle.

Figure 7:
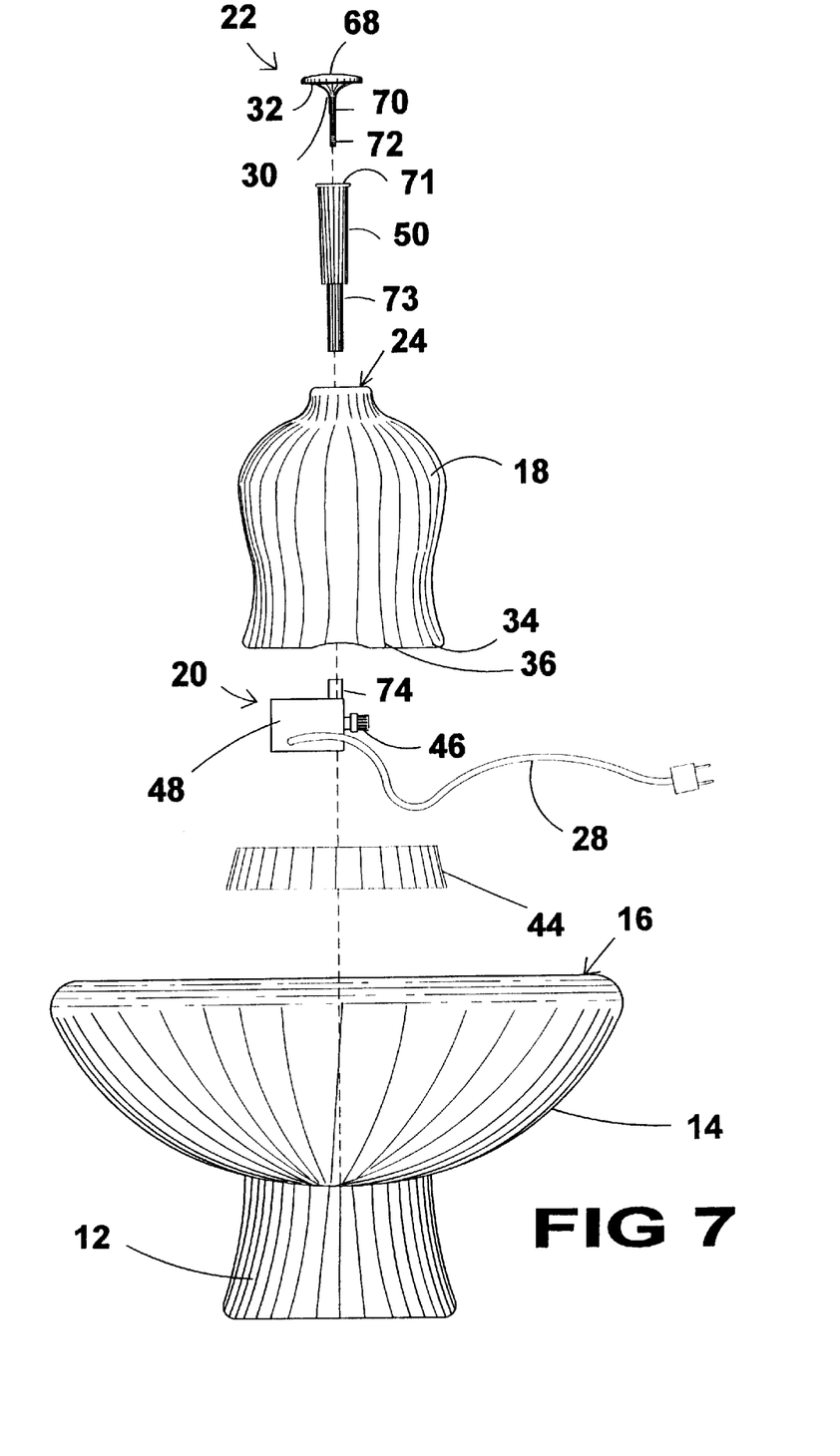
FIG. 7 is an exploded view of the fountain humidifier and air cleanser of the present invention.
Figure 8:
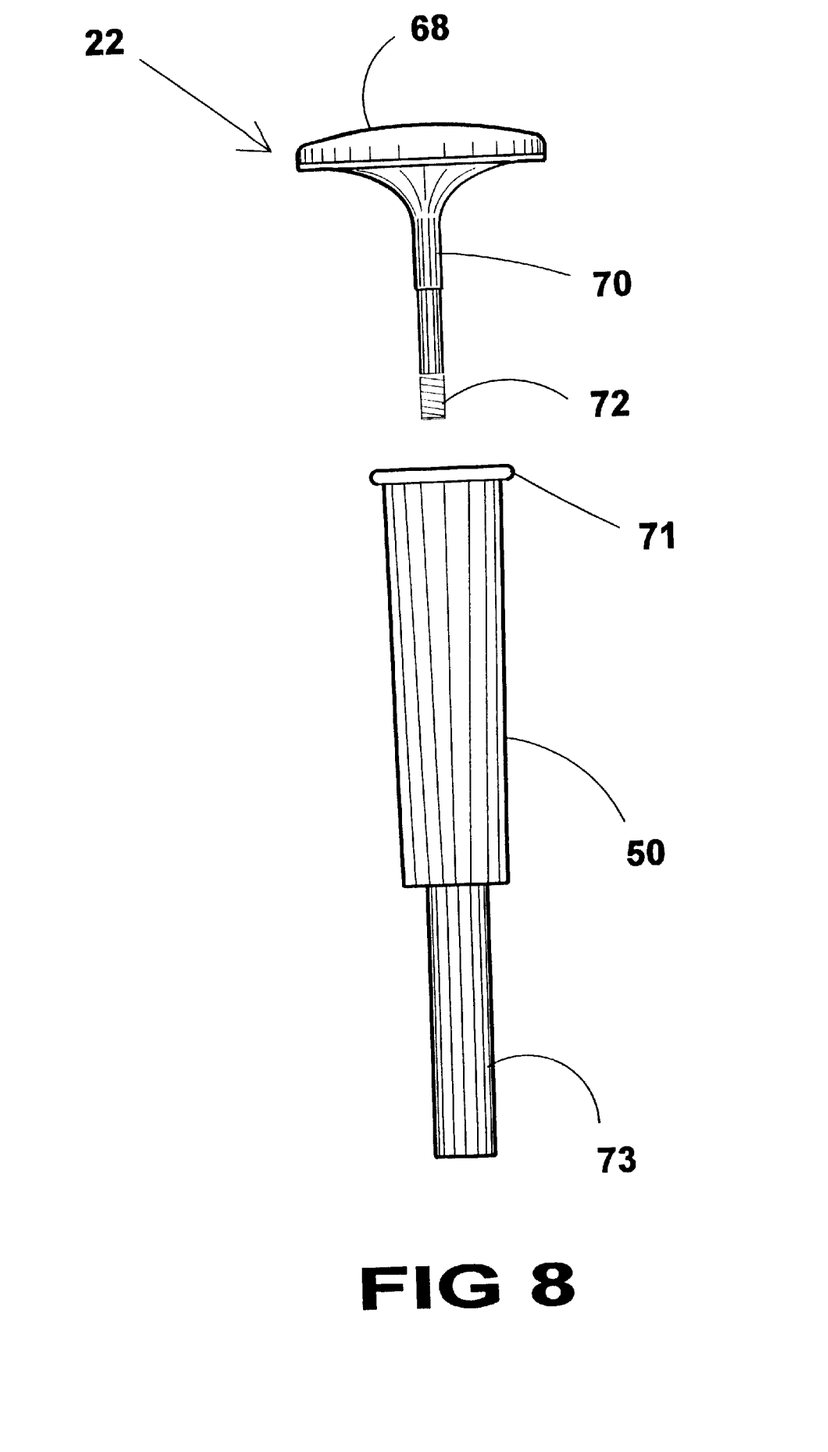
FIG. 8 is an enlarged view of the conduit and the diverter of the fountain humidifier and air cleanser of the present invention.

An exploded view of the fountain humidifier and air cleanser 10 is illustrated in FIG. 7. As can be seen from this figure, the submersible pump 20 communicates with the diverter 22 through the conduit 50. The conduit 50 is cylindrical in shape. The diverter 22 caps the conduit 50 at a distal end thereof, an enlarged exploded view of the diverter 22 and conduit 50 is shown in FIG. 8. The two members, the diverter 22 and the conduit 50, are releasably connected together wherein the fluid is forced through the conduit 50 and around the protrusion 70 as is shown in FIG. 6 and against the curved surface 30 and planar underside 32 of the diverter 22 causing the water to form the dome 26 extending between the circumferential aperture 24 and the reservoir 16.

The diverter 22 includes a cap portion 68 and a protrusion 70 extending therebelow. The protrusion 70 includes a thread 72 spiraling around a base thereof. A thread, not shown, is also positioned on an inner side of a first end 73 of the conduit for engaging the thread 72 on the protrusion 70. The conduit 50 is positioned within the bell-shaped housing 18 with the diverter 22 positioned atop the bell-shaped housing 18. The distance at which the diverter 22 is positioned above the conduit 50 is determined by the extent at which the threads are engaged. The distance between the horizontal planar surface 32 of the diverter 22 and the rim of the conduit 50 can be adjusted by turning the diverter 22 to either engage or disengage the threads and thus adjust the distance the fluid must travel to contact the curved surface 32 and planar underside of the diverter 22. This will vary the diameter of the water dome 26.

The conduit 50 is connected at a second end 73 thereof to an outlet port 74 on the pump housing 48. The fluid is provided to the conduit 50 through the intake port 46 and outlet port 74 of the pump 20. The electrical wire extending from the pump 20 for providing power to the pump 20 extends through the base 12 for connection to an external source of power. The irregular edge 36 of the base 34 of the bell-shaped housing 18 is shown in the figure and the filter 44 is sized to fit snugly within the base 34 for filtering particles present in the fluid and flowing between the irregular edge on the bell-shaped housing 18 and the base of the reservoir 16. The bell-shaped housing 18 is positioned centrally within the reservoir 16 formed by the skirt 14 extending from the base 12. The filter 44 and pump 20 are positioned within the bell-shaped housing 18 with the conduit 50 extending from the outlet port 74 of the pump housing 48. The diverter 22 extends from outside the bell-shaped housing 18 through the recess 24 whereby the protrusion 70 extends into a first end of the conduit 50. The thread 72 spiraling around the protrusion 70 engages a thread spiraling around an inner side of the first end 71 of the conduit 50 thereby connecting the diverter 20 and conduit 50 to provide a passage for fluid exiting the bell-shaped housing 18.

Figure 9:
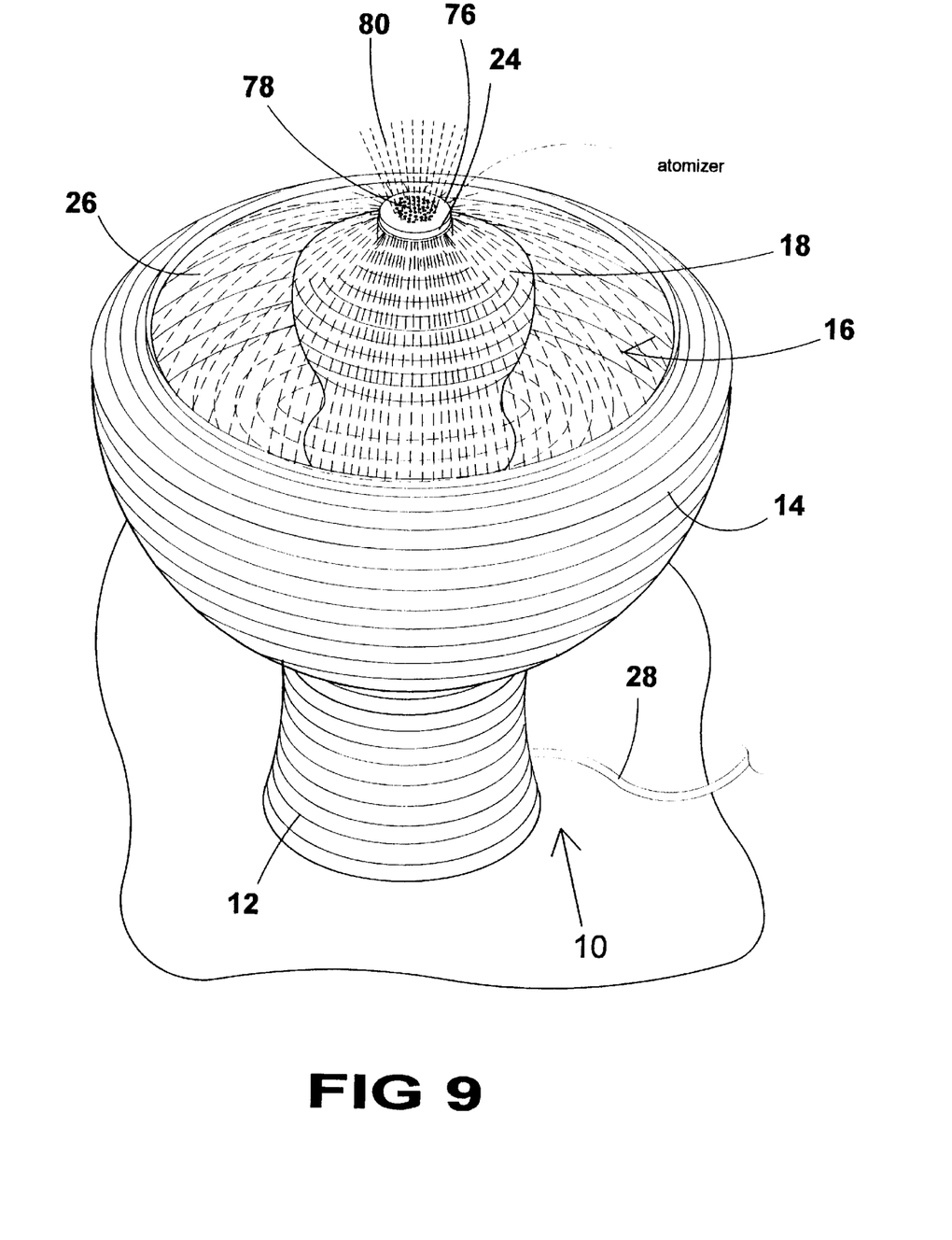
FIG. 9 is an alternate embodiment of the fountain humidifier and air cleanser present invention including a diverter having a centrally located conduit whereby an amount of the water being pumped exits through small apertures in the head of the diverter.
Figure 10:
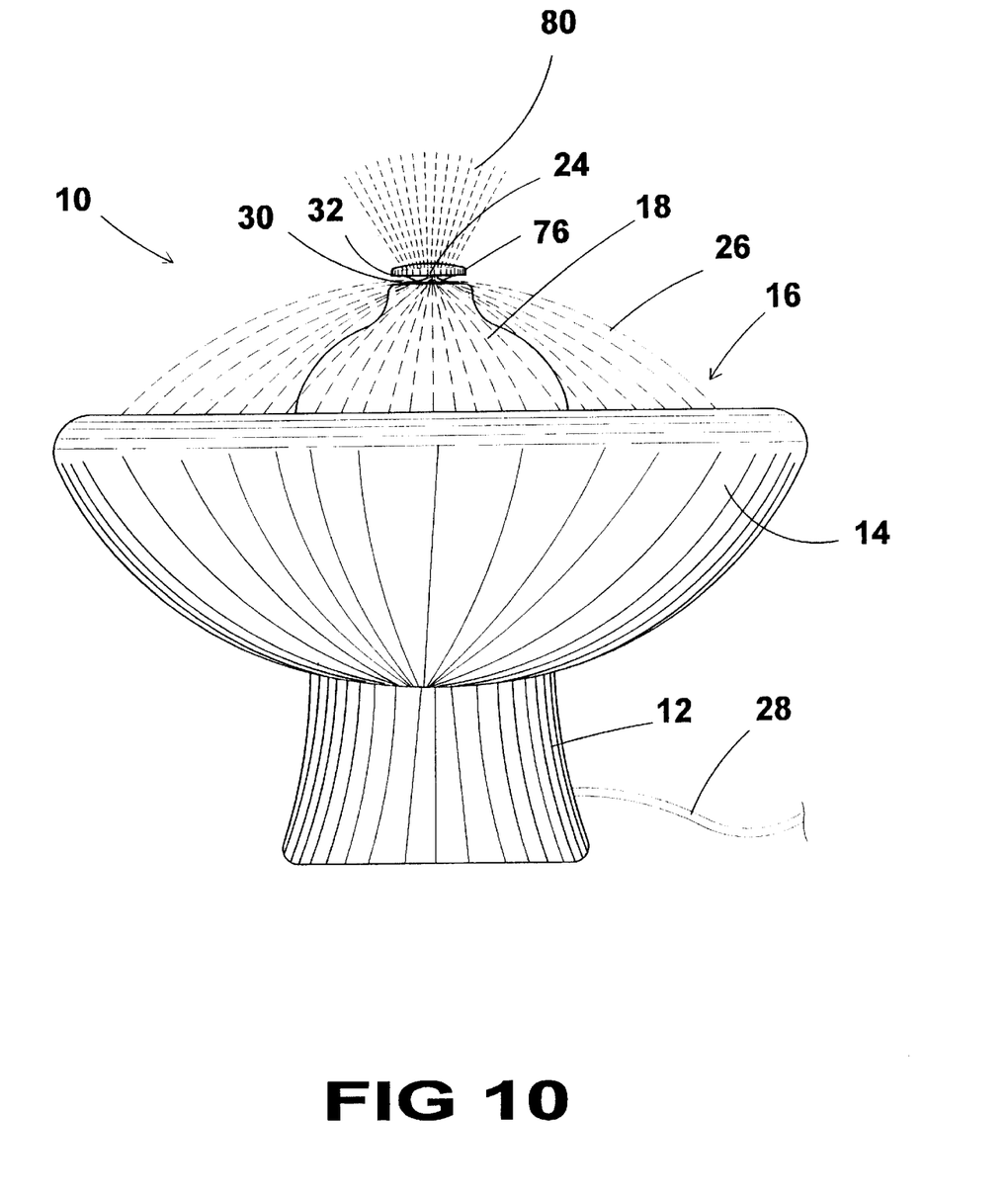
FIG. 10 is a side view of the alternate embodiment of the fountain humidifier and air cleanser of the present invention.
Figure 11:
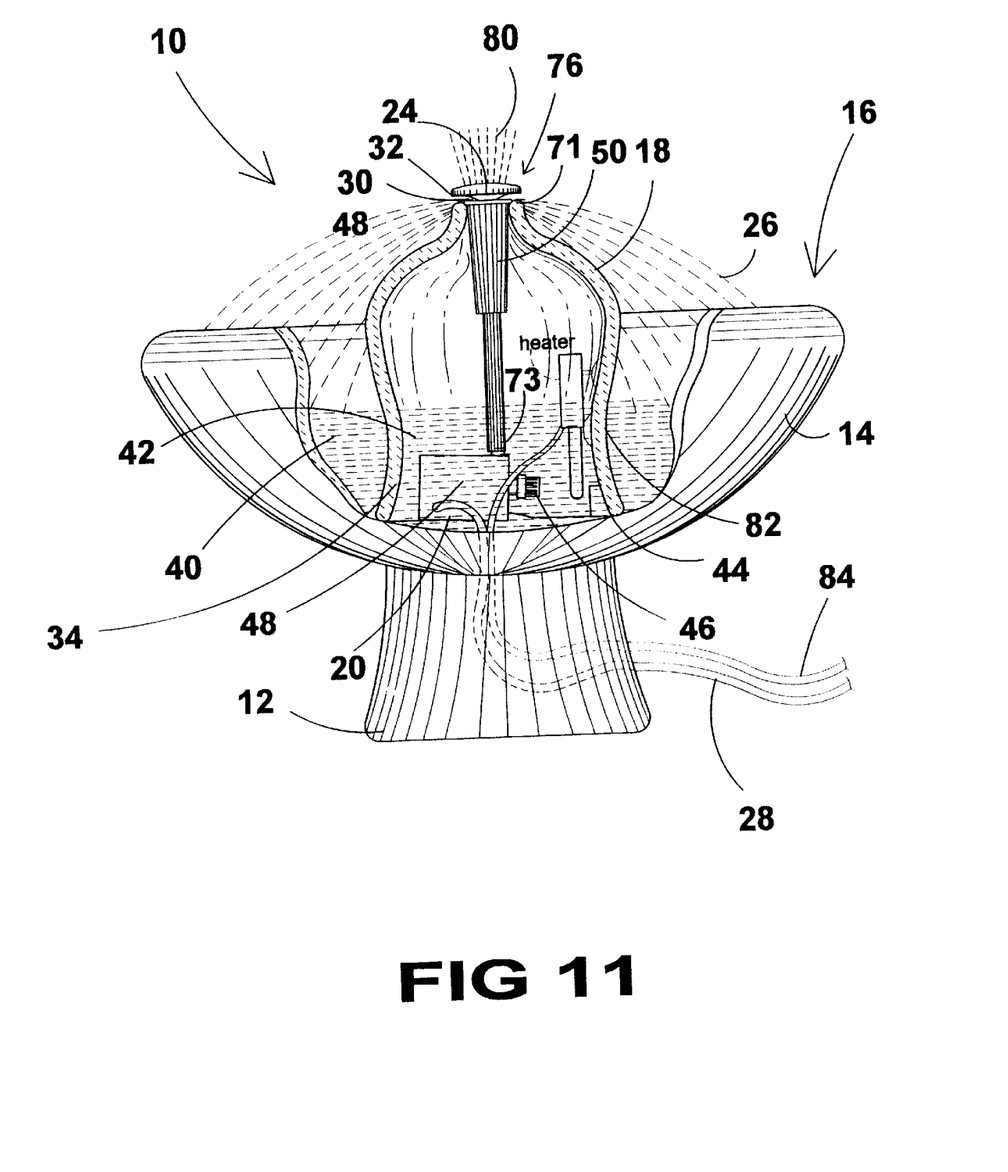
FIG. 11 is a side view with parts cutaway of the fountain humidifier and air cleanser of FIG. 9.

FIG. 9 illustrates an alternate embodiment of the fountain humidifier and air cleanser of the present invention in which the diverter includes a plurality of recesses 76 extending through the cap 68. The fluid is allowed to pass through the recesses 78 providing an atomized spray 80. The diverter 76 also includes the curved columnar shaft and planar underside whereupon the column of fluid rises along the curved surface before striking the horizontal planar underside causing the fluid to form the cascading dome 26. A side view of this embodiment is illustrated in FIG. 10 showing both the dome of fluid 26 and the atomized spray 80. FIG. 11 illustrates a cross-sectional view of the fountain humidifier and air cleanser 10 including the diverter 76 shown in FIGS. 9 and 10 along with a heater 82 positioned within the bell-shaped housing 18. The heater 82 also includes an electrical cord 84 which extends through the base 12 for connection to an external source of power. The heater 82 acts to warm the fluid within the reservoir 16 to a desired or optimal temperature for increasing the amount of moisture to be absorbed by the surrounding air and thus the humidity within the air surrounding the fountain humidifier and air cleanser 10 due to the warmer temperatures.

The operation of the fountain humidifier and air cleanser 10 will now be described with reference to the figures. In operation, the fountain humidifier and air cleanser 10 is first assembled by placing the pump 20 within a central region of the reservoir with the electrical cord 28 extending through the base 12 for connection with an external power source and the conduit 50 positioned to extend from the outlet port thereof. The point at which the electrical cord 28 of the pump 20 extends through the base 12 should be sealed to prevent any fluid within the reservoir from leaking out. If a heater 82 is being used with the fountain humidifier and air cleanser 10 then the heater 82 is placed next to the pump 20 and its electrical cord 84 is caused to extend through the base for connection with an external power source. The point at which the electrical cord 84 for the heater 82 extends through the base 12 should also be sealed to prevent any fluid within the reservoir from leaking out. The filter 44 is positioned within a base side of the bell-shaped housing 18 and the bell-shaped housing 18 is then placed to cover the pump 20 and the heater 82. The diverter is now placed such that the protrusion extends through the recess 24 in the bell-shaped housing 18. The diverter 22 is turned in a counterclockwise direction so the thread 72 on the base of the protrusion 70 engages the thread in the conduit 50. The diverter 22 is continually turned until the desired distance between the diverter 22 and the recess 24 is obtained. Fluid is now supplied to the reservoir 16 and allowed to flow between the first and second sections 40 and 42, respectively. The fluid flowing between the first and second sections 40 and 42, respectively, is filtered by the filter 44 thereby removing any particulate matter within the fluid. The fountain humidifier and air cleanser 10 is now prepared for operation.

The pump 20 is now turned on causing a suctional force to be created which acts to draw the fluid in the second section 42 into the intake port 46 of the pump. The heater 82 is also turned on to heat the fluid to a desired or optimal temperature for humidifying the air surrounding the fountain humidifier and air cleanser 10. The fluid received by the intake port 46 is provided to the conduit 50 through which it is pumped by the pump 20 and provided to the diverter 22. The fluid provided to the diverter 22 is projected through the recess 24 and against the curved surface 30 and planar underside 32 of the diverter 22 to produce the dome 26. If the diverter includes the recesses 78 extending through the cap 76, the fluid is caused to flow through the recesses 78 thereby producing an atomized spray 80. The atomized spray 80 provides additional fluid to the air thereby further humidifying the air. The fluid forming the dome 26 then falls back into the first section 40 of the reservoir 16 whereby some of the fluid forming the dome is absorbed into the atmosphere thereby humidifying the air surrounding the fountain humidifier and air cleanser 10. The fluid returning to the reservoir 16 is recycled through the above described cycle for as long as the pump is operating or until all the fluid is evaporated into the surrounding air.

The fluid transfluence performed by the present invention coupled with the segregation of the pump and a large reservoir area creates a humidifier that is easily cleaned. Furthermore, this device provides a more natural means of humidifying the air by supplying a large surface area of water whereby the water dome and reservoir interact with the atmospheric air instead of ejecting water vapor or droplets into the air or running fans over or through wet substrate material.

A more naturally occurring way of providing humidity to the air is provided by the present invention and is based on a natural mixture of available water and air temperature, as opposed to turning a dial on a mechanical device which can lead to too little moisture or too much moisture which can further lead to mold, mildew and fungal growths around heating elements, air passage conduit, and window moldings. Some of these places are impossible to clean without further alienating ones health by the use of chemicals such as fungicides.

It should also be noted that because this is a natural means of humidifying which does not entail the required use of chemicals or antibacterial agents, coupled with the large area within the reservoir that decorative elements such as goldfish could be maintained within the reservoir and the standing water will attract insects especially flies which will drown and be contained within the outer reservoir due to the small communicating apertures between the outer reservoir and the pump compartment.

In addition another embodiment is provided having all of the properties of the present invention, as well as a heater located with the pump compartment which will heat the water thereby increasing the amount of humidity within the air due to the warmer temperatures.

From the above description it can be seen that the fountain humidifier and air cleanser of the present invention is able to overcome the shortcomings of prior art devices by providing a fountain humidifier and air cleanser which is able to naturally humidify the surrounding air. The fountain humidifier and air cleanser having a pedestal reservoir for maintaining an amount of water therein, a submersible pump positioned within the reservoir for water from the pedestal reservoir to be splayed in the form of a water dome prior to returning to the reservoir, and a bell-like housing for segregating a portion of the reservoir having the submersible pump therein from the remainder of the reservoir. The diverter of the fountain humidifier and air cleanser communicates with the pump by means of a conduit extending therebetween. Furthermore, the fountain humidifier and air cleanser of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

1. A fountain humidifier and air cleanser for providing moisture to surrounding air, said fountain humidifier and air cleanser comprising:

a) a base including a skirt extending therefrom forming a reservoir for retaining a fluid therein;

b) a hollow structure in the shape of a bell-shaped housing including an opening having an annular rim in a top side thereof and a lower open base side having an irregularly shaped edge in contact with said base within said reservoir, said hollow structure being removably positioned within said reservoir whereby fluid within said reservoir is able to flow into said structure through narrow spaces between said base side and reservoir due to said irregularly shaped edge;

c) pump means positioned within said hollow structure immersed completely in said fluid within said reservoir;

d) a diverter connected directly to said pump and extending up through said opening in said top side of said hollow structure, wherein said pump pumps fluid within said reservoir against said diverter causing said fluid to form a dome shaped flow through said opening and back into said reservoir, said fluid being at least partially absorbed by the surrounding air thereby humidifying the surrounding air;

e) said diverter comprising a cap portion having a planar underside and a protrusion extending downwardly from said underside of said cap with threads on a lower end of said protrusion;

f) said pump having an outlet port with a conduit extending upwardly from said outlet port, an upper end of said conduit having a lip on the outside thereof resting on said annular rim and having internal threads adapted to receive and engage the lower end of said protrusion, whereby the distance at which said diverter extends from said conduit is adjustable by the extent the threads on said protrusion and in said conduit are engaged, said distance determining a breadth of the dome formed by the fluid; and g) an annular filter positioned on and in contact with said base within said reservoir along an inner surface of said hollow structure for filtering the fluid passing through said narrow spaces between said base of said hollow structure and said reservoir.

2. The fountain humidifier and air cleaner in claim 1, further comprising a heater for heating the fluid within said reservoir and thereby increasing an amount of moisture being provided to the surrounding air.

3. The fountain humidifier and air cleanser as recited in claim 1 wherein said diverter further includes a plurality of recesses extending through said cap, wherein fluid pumped by said pump flows through said recesses creating an atomized flow of fluid which is returned to said reservoir.

4. The fountain humidifier and air cleanser as recited in claim 1, wherein said pump further includes an input port through which the fluid is drawn in from said reservoir and delivered to said output port.

5. The fountain humidifier and air cleanser as recited in claim 4, wherein said pump further includes a filter covering said input port for filtering the fluid being drawn into said input port.

* * * * *